US009477016B2

United States Patent
Li et al.

(10) Patent No.: US 9,477,016 B2
(45) Date of Patent: Oct. 25, 2016

(54) DISPLAY AND TILED DISPLAY

(71) Applicant: BOE TECHNOLOGY GROUP CO., LTD., Beijing (CN)

(72) Inventors: Hui Li, Beijing (CN); Hyunsic Choi, Beijing (CN); Yoonsung Um, Beijing (CN); Zhiqiang Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 30 days.

(21) Appl. No.: 14/106,976

(22) Filed: Dec. 16, 2013

(65) Prior Publication Data
US 2014/0211309 A1   Jul. 31, 2014

(30) Foreign Application Priority Data

Jan. 29, 2013   (CN) .......................... 2013 1 0034602

(51) Int. Cl.
*G02B 5/04* (2006.01)
*G02B 5/30* (2006.01)
(Continued)

(52) U.S. Cl.
CPC ............... *G02B 5/04* (2013.01); *G02B 5/3025* (2013.01); *G02F 1/13336* (2013.01);
(Continued)

(58) Field of Classification Search
CPC .......... G02B 5/04; G02B 5/045; G02B 5/30; G02B 5/3025; G02B 5/3033; G02B 5/3083; G02B 5/32; G02B 6/0053; G02B 27/0081; G02B 27/09; G02B 27/0905; G02B 27/0972; G02B 27/0977; G02B 27/1066; G02B 27/126; G02B 27/28; G02B 27/283; G02B 27/285; G02F 1/133526; G02F 1/133528; G02F 1/133536; G02F 2001/133538; G02F 2001/13355; G02F 1/133524; G02F 2001/133562

USPC .............. 359/454–456, 460, 485.01, 485.03, 359/485.06, 485.07, 618, 619, 625, 629, 359/638, 639, 640; 349/57, 73
See application file for complete search history.

(56) References Cited

U.S. PATENT DOCUMENTS

2011/0102302 A1 * 5/2011 Watanabe ........... G02F 1/13336
345/4

FOREIGN PATENT DOCUMENTS

| CN | 101593473 | * 12/2009 | ............... G09F 9/35 |
| CN | 101593473 A | 12/2009 | |
| KR | 20120102947 A | 9/2012 | |

OTHER PUBLICATIONS

Meng et al., CN101593473, English Machine Translation, Provided by Espacenet, http://worldwide.espacenet.com, accessed and translated on Apr. 6, 2015.*

(Continued)

*Primary Examiner* — Stephone B Allen
*Assistant Examiner* — Adam W Booher
(74) *Attorney, Agent, or Firm* — Ladas & Parry LLP

(57) ABSTRACT

A display includes an effective display area and a frame area; an image overlap display area is disposed at a position in the effective display area, close to the frame area, and includes first display positions related to an image to be displayed in the effective display area and second display positions related to an image to be displayed in the frame area; the first and second display positions are distributed in an alternate form; a polarization splitting prism is disposed on a light-emitting surface of the display and at a position at least corresponding to the frame area and the image overlap display area; and a convergent prism configured to converge light from the second display positions in the image overlap display area to the frame area is disposed on a light-emitting surface of the polarization splitting prism. Also a tiled display is disclosed.

4 Claims, 4 Drawing Sheets

(51) Int. Cl.
*G02F 1/1335* (2006.01)
*G02F 1/1333* (2006.01)

(52) U.S. Cl.
CPC .. *G02F 1/133524* (2013.01); *G02F 1/133528* (2013.01); *G02F 1/133536* (2013.01); *G02F 1/133553* (2013.01); *G02F 2001/133538* (2013.01); *G02F 2001/133562* (2013.01)

(56) References Cited

OTHER PUBLICATIONS

Second Office Action issued by the Chinese Patent Office for Chinese Patent Application No. 2012101190362 dated Jun. 10, 2014.
English translation of Second Office Action issued by the Chinese Patent Office for Chinese Patent Application No. 2012101190362 dated Jun. 10, 2014.
First Office Action issued by State Intellectual Property Office of the People's Republic of China for Chinese Patent Application No. 20131034602.4 dated Jun. 27, 2014, 7pgs.
English translation of First Office Action issued by State Intellectual Property Office of the People's Republic of China for Chinese Patent Application No. 20131034602.4 dated Jun. 27, 2014, 7pgs.
Extended European Search Report for European Patent Application No. 14150540.4 dated May 15, 2014, 8 pgs.
Third Chinese Office Action dated Jun. 2, 2015; Appln. No. 201310034602.4.
Second Office Action issued by State Intellectual Property Office of the People's Republic of China for Chinese Patent Application No. 20131034602.4 dated Feb. 2, 2015, 3 pgs.
English translation of Second Office Action issued by State Intellectual Property Office of the People's Republic of China for Chinese Patent Application No. 20131034602.4 dated Feb. 2, 2015, 2pgs.
Office Action issued by Korean Patent Office for Korean Patent Application No. 10-2014-0004172 dated Feb. 13, 2015; 6 pgs.
English translation of Office Action issued by Korean Patent Office for Korean Patent Application No. 10-2014-0004172 dated Feb. 13, 2015; 3 pages.
English Abstract of KR20120102947A, listed above; 1 page.
Korean Office Action dated Aug. 28, 2015; Appln. No. 10-2014-0004172.

* cited by examiner

DISPLAY AND TILED DISPLAY

CROSS REFERENCE TO RELATED APPLICATIONS

This application claims priority from Chinese National Application No. 201310034602.4 filed on Jan. 29, 2013, the contents of which are incorporated herein by reference.

TECHNICAL FIELD

Embodiments of the present disclosure relate to a display and a tiled display.

BACKGROUND

With the rapid development of the thin-film transistor liquid crystal display (TFT-LCD) technology, large-size displays gradually satisfy the market development requirement of the display industry. Splicing of flat-panel displays is a main manner for achieving a large-screen display. Due to the limitations on design, production process and the like for a liquid crystal display (LCD), the LCD generally comprises a black frame portion. The frame portion accommodates circuit leads, sealant, black matrix, and so on of an LCD panel, and provides an indispensable space portion for the electrical driving and the production process. Therefore, when LCD panels are used for realizing a tiled display, the displayed images can be partitioned to corresponding regions by large gaps, and therefore the viewing property and the continuity of the spliced images can be destroyed.

A conventional method for eliminating the gaps between spliced displays is to amplify images at the edges of the displays to a certain scale and fill the gaps with the amplified images. But this conventional method not only cannot completely remove the gaps but also can disadvantageously affect the images to be displayed to a certain degree.

SUMMARY

Embodiments of the present disclosure provide a display and a tiled display, which can overcome the defect that the image display quality is affected by the problem that a large-size tiled display in the prior art cannot completely remove gaps between single displays.

An aspect of the present disclosure provides a display, comprising an effective display area and a frame area; an image overlap display area is disposed at a position in the effective display area, close to the frame area and includes first display positions related to an image to be displayed in the effective display area and second display positions related to an image to be displayed in the frame area; the first display positions and the second display positions are distributed in an alternate form; a polarization splitting prism is disposed on a light-emitting surface of the display and at a position at least corresponding to the frame area and the image overlap display area; and a convergent prism, configured to converge light from the second display positions in the image overlap display area to the frame area, is disposed on a light-emitting surface of the polarization splitting prism.

Further, for example, in the display, a polarizing reflective film is disposed on a reflecting surface of the convergent prism and does not reflect light from the first display positions but reflects light from the second display positions.

Further, for example, in the display, an included angle is formed between the reflecting surface of the convergent prism and the polarization splitting prism.

Further, for example, in the display, signals are inputted into the image overlap display area by means of image interlaced scan, so that the first display positions and the second display positions in the image overlap display area are distributed in an alternate form.

Another aspect of the present disclosure provides a tiled display, comprising any one of the above displays.

Further, for example, the tiled display comprises a first display and a second display which are abutted, in which the first display includes a first effective display area and a first frame area; the second display includes a second effective display area and a second frame area; a first image overlap display area is disposed at a position in the first effective display area, close to the first frame area; a second image overlap display area is disposed at a position in the second effective display area, close to the second frame area; the first frame area and the second frame area are abutted to form a frame display area; the first image overlap display area includes first display positions related to an image to be displayed in the first effective display area and second display positions related to an image to be displayed in the first frame area; the first display positions and the second display positions are distributed in an alternate form; the second image overlap display area includes third display positions related to an image to be displayed in the second effective display area and fourth display positions related to an image to be displayed in the second frame area; the third display positions and the fourth display positions are distributed in an alternate form; a polarization splitting prism is disposed on a light-emitting surface of the tiled display and at a position at least corresponding to the first frame area, the second frame area, the first image overlap display area and the second image overlap display area; and a convergent prism, configured to converge light from the second display positions and the fourth display positions respectively disposed in the first image overlap display area and the second image overlap display area to the frame display area, is disposed on a light-emitting surface of the polarization splitting prism.

Further, for example, in the tiled display, polarizing reflective films are disposed on reflecting surfaces of the convergent prism, and do not reflect light from the first display positions and the third display positions but reflect light from the second display positions and the fourth display positions.

Further, for example, in the tiled display, the convergent prism includes two reflecting prisms which are arranged opposite to each other; and included angles are respectively formed between the two reflecting prisms and the polarization splitting prism.

Further, for example, in the tiled display, an included angle is formed between the two reflecting prisms; and a size of the opening of the included angle is compatible with the size of the frame display area.

Further, for example, in the tiled display, signals are inputted into the first image overlap display area and the second image overlap display area by means of image interlaced scan respectively, and correspond to the alternation distribution of the first display positions and the second display positions in the first image overlap display area and the alternation distribution of the third display positions and the fourth display positions in the second image overlap display area respectively.

Further, for example, in the tiled display, the size of the first image overlap display area and the second image overlap display area is a half of the size of the frame display area.

The display and the tiled display provided by the embodiments of the present disclosure can achieve borderless splicing, minimize the visual feeling of fragmentation for viewers, and ensure that the viewers can see full, clear and high-quality display images.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

Simple description will be given below to the accompanying drawings of the embodiments to provide a more clear understanding of the technical proposals of the embodiments of the present disclosure. It will be obvious to those skilled in the art that the drawings described below only involve some embodiments of the present disclosure but are not intended to limit the present disclosure.

REFERENCE NUMERALS OF THE DRAWINGS

1: effective display area; 2: frame area; 3: image overlap display area; 4: polarization splitting prism; 5: convergent prism; 51: reflecting prism; 52: polarizing reflective film; 6: first display; 61: first effective display area; 62: first frame area; 63: first image overlap display area; 7: second display; 71: second effective display area; 72: second frame area; 73: second image overlap display area; 8: frame display area.

DETAILED DESCRIPTION

Further detailed description will be given below to the preferred embodiments of the present disclosure with reference to the accompanying drawings and the embodiments. The following embodiments are only intended to illustrate the present disclosure and not intended to limit the scope of protection of the present disclosure.

Unless otherwise specified, the technical or scientific terms used herein have normal meanings understood by those skilled in the art. The phrases such as "first", "second" and the like used in the disclosure do not indicate the sequence, the number or the importance but are only used for distinguishing different components. The phrases such as "comprising", "including" or the like only indicates that an element or a component before the phrases contains elements or components listed after the phrases and equivalents thereof, not excluding other elements or components. The phrases such as "On", "under", "left", "right" and the like only indicate the relative position relationship which is correspondingly changed when the absolute position of a described object is changed Herein, the phrase "A and B being distributed in an alternate form" the like means the alternating arrangement between A and B, for example, ABABAB . . . or BABABA . . . .

Figure 1:
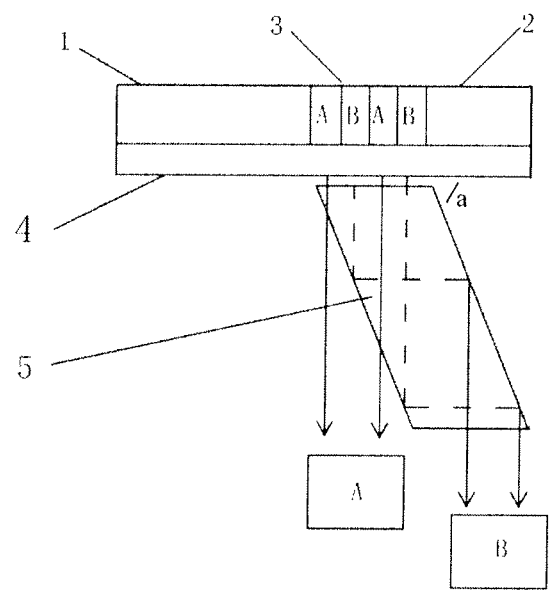
FIG. 1 is a schematic structural view of a display provided by an embodiment of the present disclosure.
Figure 2:
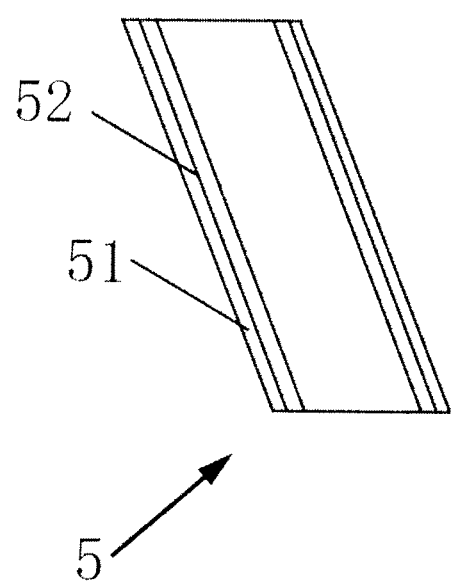
FIG. 2 is a schematic structural view of a polarization splitting prism in the display provided by an embodiment of the present disclosure.

As illustrated in FIGS. 1 and 2, a display provided by an embodiment of the present disclosure comprises: an effective display area 1 and a frame area 2. The figures only illustrate the peripheral area of the display; the effective display area 1 is disposed in the central section of the display; and the frame area 2 is disposed in an edge area outside of the effective display area 1.

In the display of the embodiment, an image overlap display area 3 is disposed at a position in the effective display area 1, close to the frame area 2, and includes first display positions A related to an image to be displayed in the effective display area 1 and second display positions B related to an image to be displayed in the frame area 2. In the embodiment, the first display positions A and the second display positions B are distributed in an alternate form. Each first display position A and each second display position B may correspond to one or more pixels.

In the display of the embodiment, a polarization splitting prism 4 and a convergent prism 5 are disposed on a light-emitting surface of the display and at the position at least corresponding to the frame area 2 and the image overlap display area 3.

The convergent prism 5 configured to converge the light emitted from the second display positions B in the image overlap display area 3 to the frame area 2 is disposed on a light-emitting surface of the polarization splitting prism 4. Due to the polarization splitting prism 4, the polarization direction of the light of the image to be displayed in the effective display area 1 is kept unchanged, and the polarization direction of the light of the image to be displayed in the frame area 2 is rotated, i.e., rotated by 90 degrees, and hence the polarization direction of the light of the image to be displayed in the effective display area 1 is perpendicular to the polarization direction of the light of the image to be displayed in the frame area 2.

A polarizing reflective film 52 and a reflecting prism 51 are disposed on a reflecting surface of the convergent prism 5 in sequence. The polarizing reflective films 52 do not reflect the light of the image to be displayed in the effective display area 1 and allow the light to transmit, but reflect the light of the image to be displayed in the frame area 2. Also, within the composite layer of the polarizing reflective film 52 and a reflecting prism 51, the reflecting prism 51 also reflects the light of a certain polarization state but transmits the light of other polarization state, and such a certain polarization state can be elected as required.

With the convergent prism 5, the light at the second display positions B in the image overlap display area 3 can converge to the frame area 2. The polarizing reflective film 52 and the reflecting prism 51 as a whole can selectively transmit or reflect light at different positions according to different polarization directions of the light emitted from the light-emitting surface of the polarization splitting prism 4. For instance, the polarizing reflective film 52 and the reflecting prism 51 as a whole do not reflect the light emitted from the first display positions A but allows the light to transmit, but reflect the light emitted from the second display positions B. Therefore, the light emitted from the second display positions B can be reflected by the polarizing reflective film 52 and the reflecting prism 51. The polarizing reflective film 52 is, for instance, a wire-grid polarizer or a reflective polarizer.

A wire-grid polarizer utilizes the oscillation characteristics of free electrons on a metal surface, so that transverse electric (TE) polarized light, of which the electric field direction is parallel to the wire-grid direction, can excite electrons to oscillate along the wire-grid direction, and hence is reflected. But transverse magnetic (TM) polarized light, of which the electric field direction is perpendicular to the wire-grid direction, cannot excite the oscillation of the free electrons due to the limitation of the periodic structure of the wire grid. Therefore, the TM polarized light mainly presents the transmission characteristic, that is, is transmitted.

A reflective polarizer is formed by coating a transparent conductive film on a substrate. The working principle of the reflective polarizer is the destructive interference or at least partial destructive interference occurs to a certain polarized component of light in the film. For instance, when P components in the light are suppressed, S components not suppressed can achieve high reflectivity.

An included angle "a" is formed between the reflecting surface of the convergent prism 5 and the polarization splitting prism 4. Due to the included angle "a," light at the second display positions B can be completely converged to the frame area 2, so that the frame area 2 can achieve image display.

Preferably, for example, each convergent prism 5 is at least provided with two polarizing reflective films 52 which are parallel to each other. Included angles between the polarizing reflective films 52 and the polarization splitting prism 4 are basically equal to the included angle between the reflecting surface of the convergent prism 5 and the polarization splitting prism 4, so that the light emitted from the second display positions B can be completely converged to the frame area 2 through the polarizing reflective films 52 which are parallel to each other, and hence the frame area 2 can achieve corresponding image display.

Signals are inputted into an input terminal (not shown) of the image overlap display area 3 by means of image interlaced scan. The input signals correspond to the distribution (for instance, alternation distribution) of the first display positions A and the second display positions B in the image overlap display area 3.

Figure 3:
FIG. 3 is a schematic diagram illustrating the beam splitting principle of the polarization splitting prism in the display provided by an embodiment of the present disclosure.

FIG. 3 illustrates the working principle of an example of the polarization splitting prism 4. In the image overlap display area 3, the polarization splitting prism 4 is formed of a polarizer array. The polarizer array comprises an upper transparent substrate, a lower transparent substrate and a liquid crystal layer disposed between the two substrates. The liquid crystal layer is disposed at a position at which the polarization direction of light is required to be changed by a predetermined angle; and a cavity (air) is formed or a transparent material, for instance, a transparent resin, is filled at a position at which the polarization direction of the light is not required to be changed. For instance, the portion corresponding to each column of pixels A1 corresponding to the display positions A is made of a transparent resin material, and the polarization direction of light of a displayed image passing through the portion is not changed; and the portion corresponding to each column of pixels B1 corresponding to the display positions B is provided with the liquid crystal layer. For instance, liquid crystal molecules of the liquid crystal layer are subjected to a 90 degree TN-type spiral arrangement, so that the polarization angle of the light passing through the liquid crystal layer can be rotated by 90 degrees. The polarization splitting prism 4 can achieve the effect that the polarization direction of the light at the display positions A is perpendicular to the polarization direction of the light at the display positions B. The positions and the specific layer number of the polarizer array may be set as desired. The pixels A1 corresponding to the first display positions A are configured to obtain a corresponding image to be displayed, and the pixels B1 corresponding to the second display positions B are configured to obtain a corresponding image to be displayed.

It should be noted that the first display positions A or the second display positions B mentioned in the embodiment are configured to classify images to be displayed in certain areas and do not indicate that the contents displayed at the positions A or B indicated in the figure must be completely the same. The alternation distribution of the first display positions A and the second display positions B means that the first display positions A and the second display positions B are interleaved in the image overlap display area 3. The light emitted from the display positions A can be used to form a continuous and complete image (or a partial image) in combination in the effective display area 1 under the effect of the polarization splitting prism 4 and the convergent prism 5. Similarly, the light emitted from the display positions B can be used to form a continuous and complete image (or a partial image) in combination in the frame area 2 under the effect of the polarization splitting prism 4 and the convergent prism 5. Moreover, the image display in the area, other than the image-overlap display area 3, of the effective display area 1 of the display can be conducted in a normal display manner. The size of the image overlap display area 3 may be determined by the frame size and the deflection angle of the light of the polarizing reflective films 52.

As illustrated in FIGS. 4 to 7, the tiled display provided by the embodiment of the present disclosure is formed by splicing two single displays, each of which may be a display as described in the above embodiment. For instance, the two displays include a first display 6 and a second display 7. In the exemplary production process, the number of the displays may include, but not limited to, two, and may be specifically determined based on the size of the displays.

Figure 4:
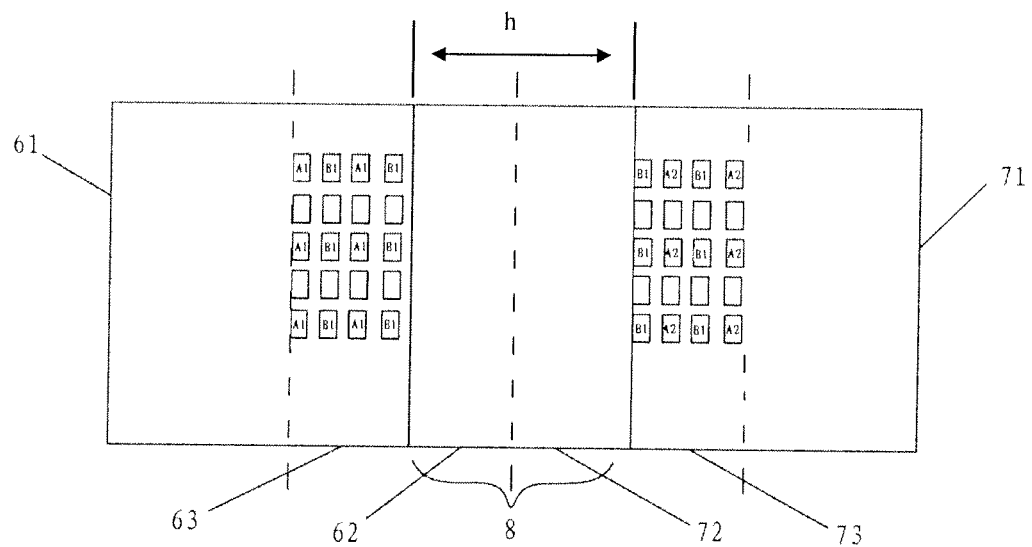
FIG. 4 is a schematic structural view of a display in a tiled display provided by an embodiment of the present disclosure.

As illustrated in FIG. 4, the first display 6 includes a first effective display area 61 and a first frame area 62; and the second display 7 includes a second effective display area 71 and a second frame area 72. When the first display 6 and the second display 7 are jointed, a larger display can be obtained by abutting the first frame area 62 and the second frame area 72. A frame display area 8 is formed by the first frame area 62 and the second frame area 72, and the width of the frame display area 8 is "h." An area of the first effective display area 62, close to the first frame area 62, is a first image overlap display area 63; and an area of the second effective display area 71, close to the second frame area 72, is a second image overlap display area 73.

The first image overlap display area 63 includes third display positions A1 related to an image to be displayed in the first effective display area 61 and fourth display positions B1 related to an image to be displayed in the first frame area 62. For instance, the third display positions A1 and the fourth display positions B1 are distributed in an alternate form. The second image overlap display area 73 includes fifth display positions A2 related to an image to be displayed in the second effective display area 71 and fourth display positions B1 related to an image to be displayed in the second frame area 72. For instance, the fifth display positions A2 and the fourth display positions B1 are distributed in an alternate form.

Signals are inputted into input terminals of the first image overlap display area 63 and the second image overlap display area 73 by means of image interlaced scan respectively, correspond to the distribution (for instance, alternation distribution) of the third display positions A1 and the fourth display positions B1 in the first image overlap display area 63, and similarly correspond to the distribution (for instance, alternation distribution) of the fifth display positions A2 and the fourth display positions B1 in the second image overlap display area 73.

In order to drive the first image overlap display area 63 and the second image overlap display area 73 to be cooperate so as to display an image in the frame display area 8, the width of each of the first image overlap display area 63 and the second image overlap display area 73 may be set to be a half of the width "h" of the frame display area 8, that is, the width of each of the first image overlap display area 63 and the second image overlap display area 73 is h/2.

The width of each of the first image overlap display area 63 and the second image overlap display area 73 includes, but not limited to, h/2, and may be adjusted according to the actual situations.

If the image displayed in the first effective display area 61 is A1 and the image displayed in the first frame area 62 (corresponding to the image to be displayed in the frame display area 8) is B1, the image displayed in the first image overlap display area 63 is A1B1. If the image displayed in the second effective display area 71 is A2 and the image displayed in the second frame area 72 (corresponding to the image to be displayed in the frame display area 8) is B1, the image displayed in the second image overlap display area 72 is A2B1.

Figure 5:
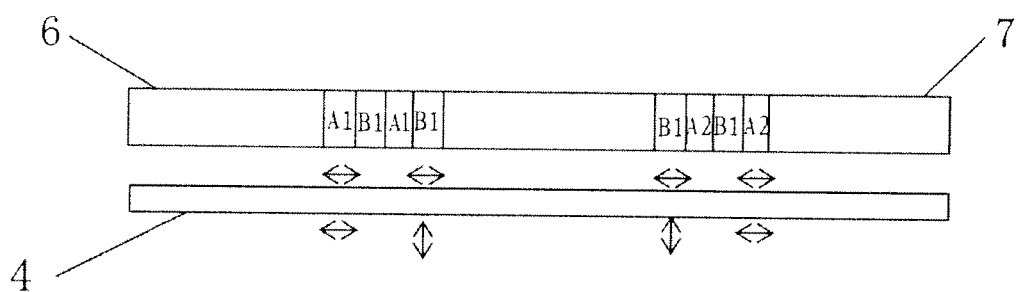
FIG. 5 is a schematic structural view of a polarization splitting prism in the tiled display provided by an embodiment of the present disclosure.

Of course, it can be understood by those skilled in the art that: it is feasible that the image displayed in the first effective display area 61 or the image displayed in the first frame area 62 corresponds to the display positions A1 or B1 as illustrated in FIG. 5, which is exchangeable, as long as the display positions A1 and B1 are alternated. Preferably, the image to be displayed in the frame display area 8 corresponds to the display positions B1 closer to the first frame area 62. Similarly, the images corresponding to the display positions A2 and B1 are exchangeable. Preferably, the image to be displayed in the frame display area 8 corresponds to the display positions B1 closer to the second frame area 62.

As illustrated in FIG. 5, a polarization splitting prism 4 is disposed on a light-emitting surface of the tiled display provided by the embodiment. Due to the polarization splitting function of the polarization splitting prism 4, the polarization direction of the light of an image to be displayed in the effective display area 61 or 71 is kept unchanged, but the polarization direction of the light of an image to be displayed in the frame display area 8 is rotated, i.e., rotated by 90 degrees, and hence the polarization direction of the light of the image to be displayed in the effective display areas 61 and 71 is perpendicular to the polarization direction of the light of the image to be displayed in the frame display area 8. For instance, the polarization direction of the light at the display positions A1 and A2 is kept unchanged, but the polarization direction of the light at the display positions B1 is rotated, i.e., rotated by 90 degrees, and hence the polarization direction of the light at the display positions A1 and A2 is perpendicular to the polarization direction of the light at the display positions B1. Of course, with a polarization splitting prism 4 of different performances, the polarization direction of the light at the display positions B1 can be kept unchanged, whereas the polarization direction of the light at the display positions A1 and A2 can be rotated by 90 degrees, and hence the polarization direction of the light at the display positions B1 is perpendicular to the polarization direction of the light at the display positions A1 and A2.

Figure 6:
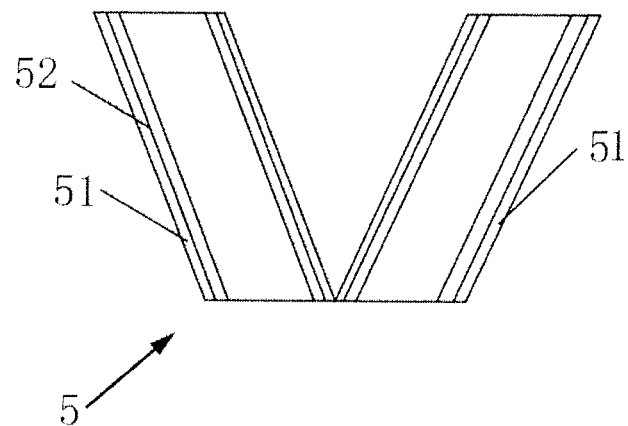
FIG. 6 is a schematic structural view of a convergent prism in the tiled display provided by an embodiment of the present disclosure.

As illustrated in FIG. 6, a convergent prism 5 provided with a polarizing reflective film 52 on each side is disposed on a light-emitting surface of the polarization splitting prism 4. The polarizing reflective film 52 is a reflective film made of a material such as a metal or metal oxide. For example, the polarizing reflective film 52 does not reflect the light at the display positions A1 and A2 but reflects the light at the display positions B1. With the convergent prism 5, the light at the display positions B1 disposed in the first image overlap display area 63 and the second image overlap display area 73 is respectively converged to the frame display area 8.

Figure 7:
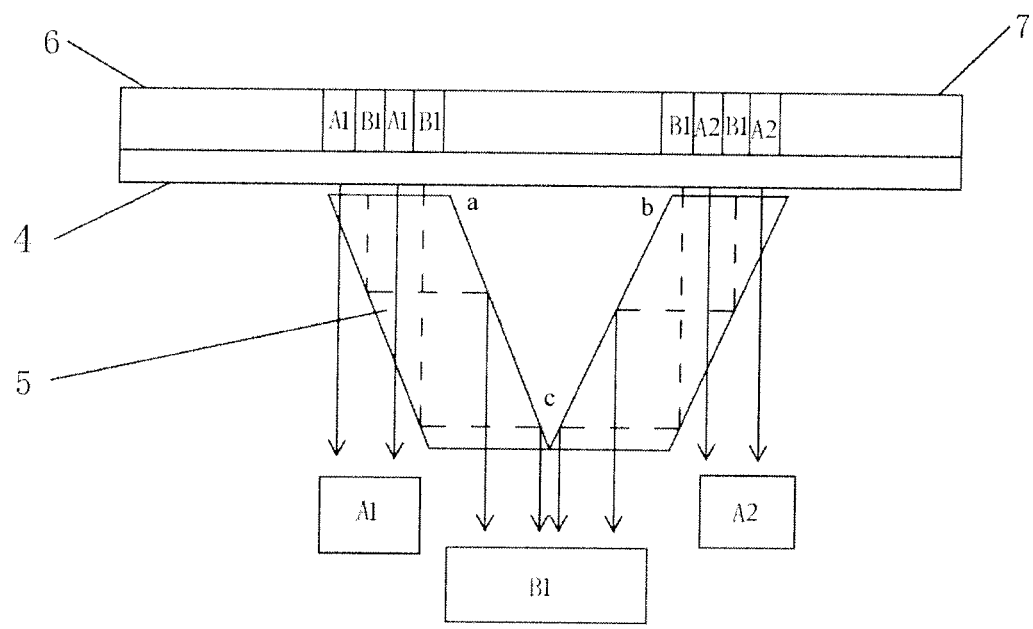
FIG. 7 is a schematic structural view of the tiled display provided by an embodiment of the present disclosure.

For instance, as illustrated in FIGS. 6 and 7, the convergent prism 5 further includes two reflecting prisms 51 which are arranged opposite to each other; and included angles "a" and "b" are respectively formed between the two reflecting prisms 51 and the polarization splitting prism 4. Moreover, a predetermined included angle "c" is formed between the two reflecting prisms 51, and the size of the opening of the predetermined included angle "c" is compatible with the size of the frame display area 8.

For instance, the two quadrilateral reflecting prisms 51 in the convergent prism 5 are symmetrically arranged; and the central line of the opening formed by the two quadrilateral reflecting prisms 51 and the central line of the frame display area 8 are on the same straight line. As illustrated in FIG. 7, the light passing through the polarization splitting prism 4 acts on the convergent prism 5 coated with the polarizing reflective films 52, and the light at the display positions A1 and A2 is not reflected by the polarizing reflective films 52 and the reflecting prisms 51 and directly transmitted to display the images of the effective display area 61 and 71. But the polarizing reflective films 52 and the reflecting prisms 51 reflect the light at the display positions B1, and hence the light at the display positions B1, related to the image to be displayed in the frame display area 8, in the first image overlap display area 63 and the second image overlap display area 73 is deflected; and the image is deflected to the frame display area 8, and hence the frame display area 8 can also normally display the image, and consequently a borderless tiled display can be finally achieved.

It can be understood that: in the above embodiment of the present disclosure, the display is provided with at least one frame or two displays are provided with at least one frame are mutually spliced; but the present disclosure is not limited thereto and is also applicable to a display provided with frames (for instance, there are frames on all the four sides) and is also applicable to the case that the displays all with the frames are spliced.

Figure 8:
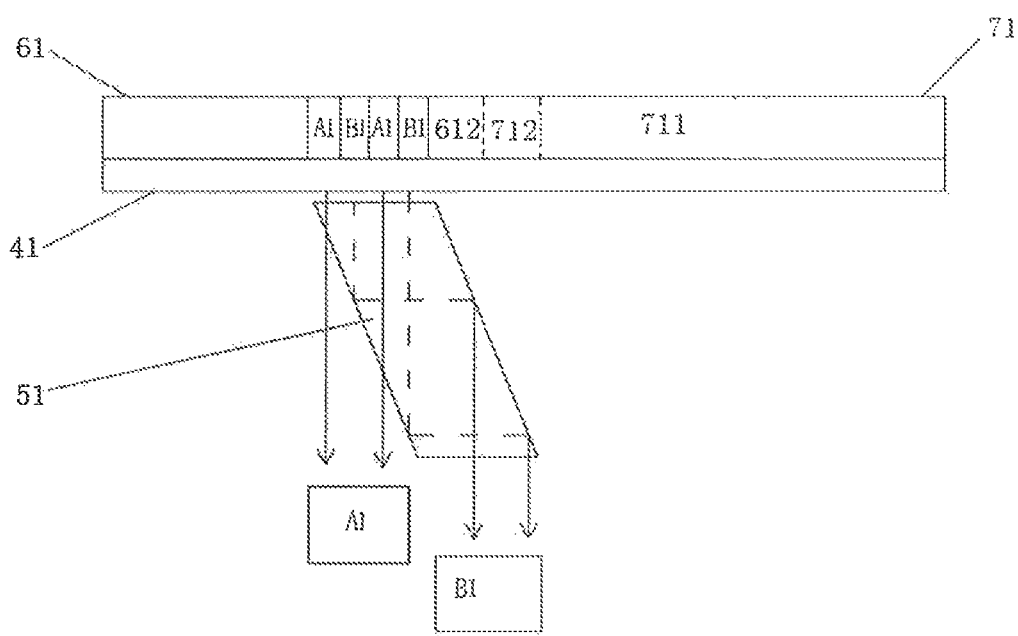
FIG. 8 is a schematic structural view of the tiled display provided by another embodiment of the present disclosure.

It can be understood that: during splicing displays, as shown in FIG. 8, an image overlap display area of one display 61 may include third display positions A1 related to an image to be displayed in the first effective display area and fourth display positions B1 related to an image to be displayed in the first frame area 612, and the third display positions A1 and the fourth display positions B1 are distributed in an alternate form, while a normally displayed image is only required to be inputted into the other display 71, and the effective display area 711 and the image overlap display area are not required to be divided. The light emitted from the fourth display positions B1 may be deflected to a frame area of the display through the polarizing reflecting films 52 and displayed, or may be deflected to a frame area 712 of the other display 71 and displayed, in which case a borderless tiled display can also be achieved.

Of course, the specific offset amount of the fourth display positions B1 related to the image to be displayed in the frame area may be determined by the adjustment of the included angles a between the polarizing reflective films 52 and the polarization splitting prism 4. Similarly, the borderless tiled display can be achieved by appropriate selection and adjustment of the included angles between the polarizing reflective films 52 and the polarization splitting prism 4 and adjustment of the number of the polarizing reflective films 52 according to the border size of the display.

In the tiled display provided by the embodiment of the present disclosure, by the additional arrangement of the polarization splitting prism and the convergent prism on the display, a borderless tiled display can be obtained, and hence the visual feeling of fragmentation for viewers can be minimized and it can be ensured that the viewers see complete, clear and high-quality display images.

The embodiment of the disclosure being thus described, it will be obvious that the same may be varied in many ways. Such variations are not to be regarded as a departure from the spirit and scope of the disclosure, and all such modifications as would be obvious to those skilled in the art are intended to be included within the scope of the following claims.

What is claimed is:

1. A tiled display comprising a first display and a second display which are abutted against each other and in a same plane, in which the first display includes a first effective display area and a first frame area; the second display includes a second effective display area and a second frame area;
   a first image overlap display area is disposed at a position in the first effective display area, close to the first frame area; the first frame area and the second frame area are abutted to form a frame display area; the first image overlap display area includes first display positions related to an image to be displayed in the first effective display area and second display positions related to an image to be displayed in the first frame area; the first display positions and the second display positions are distributed in an alternate form;
   a polarization splitting prism is disposed on a light-emitting surface of the tiled display and at a position at least corresponding to the first frame area and the second frame area, wherein the polarization splitting prism is configured to make a polarization direction of light from the first display positions perpendicular to a polarization direction of light from the second display positions; and
   a convergent prism, configured to converge light from the second display positions disposed in the first image overlap display area to the first frame display area and the second frame display area, is disposed on a light-emitting surface of the polarization splitting prism.

2. The display according to claim 1, wherein a polarizing reflective film is disposed on a reflecting surface of the convergent prism and does not reflect light from the first display positions but reflects light from the second display positions.

3. The display according to claim 1, wherein an included angle is formed between the reflecting surface of the convergent prism and the polarization splitting prism.

4. The display according to claim 1, wherein signals are inputted into the image overlap display area by means of image interlaced scan, so that the first display positions and the second display positions in the image overlap display area are distributed in an alternate form.

* * * * *